(12) United States Patent
Barnett et al.

(10) Patent No.: US 11,579,240 B2
(45) Date of Patent: Feb. 14, 2023

(54) ATTITUDE DETERMINATION SYSTEM

(71) Applicant: THE UNIVERSITY OF SUSSEX, Brighton (GB)

(72) Inventors: Anna Megan Barnett, Brighton (GB); Richard Justin Parsons, Brighton (GB)

(73) Assignee: THE UNIVERSITY OF SUSSEX, Brighton (GB)

( * ) Notice: Subject to any disclaimer, the term of this patent is extended or adjusted under 35 U.S.C. 154(b) by 878 days.

(21) Appl. No.: 16/327,209

(22) PCT Filed: Aug. 21, 2017

(86) PCT No.: PCT/GB2017/052469
§ 371 (c)(1),
(2) Date: Feb. 21, 2019

(87) PCT Pub. No.: WO2018/037218
PCT Pub. Date: Mar. 1, 2018

(65) Prior Publication Data
US 2019/0212413 A1    Jul. 11, 2019

(30) Foreign Application Priority Data
Aug. 22, 2016   (GB) .................................... 1614330

(51) Int. Cl.
*G01S 3/78*   (2006.01)
*G01S 5/16*   (2006.01)
*G01S 3/786*  (2006.01)

(52) U.S. Cl.
CPC ............ *G01S 5/163* (2013.01); *G01S 3/7862* (2013.01)

(58) Field of Classification Search
CPC ....................................................... G01S 5/16
See application file for complete search history.

(56) References Cited

U.S. PATENT DOCUMENTS

| 3,414,213 A | 12/1968 | Eckermann |
| 4,810,870 A | 3/1989 | Tsuno et al. |

(Continued)

FOREIGN PATENT DOCUMENTS

| CA | 2391873 A1 | 5/2001 |
| CN | 100460815 C | 2/2009 |

(Continued)

OTHER PUBLICATIONS

Examination Report for European Patent Application No. 17757859.8, dated Dec. 10, 2021, 7 pages.

(Continued)

*Primary Examiner* — Shi K Li
(74) *Attorney, Agent, or Firm* — Withrow & Terranova, P.L.L.C.; Vincent K. Gustafson

(57) ABSTRACT

An instrument (20) determines the attitude of a spacecraft (3) on which it is mounted, by interacting incident light (11) from the Sun with one or more light conditioning elements (12) and thereby forming a diffraction pattern at a photosensitive detector (13). The intensity distribution of light on the detector (13) is dependent on the angle of incidence of the light (11). An on-board computer (16) determines a direction vector to the Sun based on the light diffraction pattern detected by the detector (13).

20 Claims, 9 Drawing Sheets

(56) References Cited

U.S. PATENT DOCUMENTS

| | | | |
|---|---|---|---|
| 4,874,937 | A | 10/1989 | Okamoto |
| 5,424,535 | A | 6/1995 | Albion et al. |
| 5,474,264 | A | 12/1995 | Lund et al. |
| 5,602,384 | A | 2/1997 | Nunogaki et al. |
| 5,837,894 | A | 11/1998 | Fritz et al. |
| 5,844,232 | A | 12/1998 | Pezant |
| 5,965,330 | A | 10/1999 | Evans et al. |
| 6,137,171 | A | 10/2000 | Joshi |
| 6,490,801 | B1 | 12/2002 | Hersom et al. |
| 6,861,633 | B2 | 3/2005 | Osborn |
| 7,447,591 | B2 | 11/2008 | Belenkii et al. |
| 7,552,026 | B2 | 6/2009 | Zhang et al. |
| 7,924,415 | B2 | 4/2011 | Leviton |
| 8,159,156 | B2 | 4/2012 | Henig et al. |
| 8,619,249 | B2 | 12/2013 | Meijer et al. |
| 8,710,772 | B2 | 4/2014 | Henig et al. |
| 9,019,509 | B2 | 4/2015 | Laine et al. |
| 9,116,046 | B2 | 8/2015 | Fant et al. |
| 2002/0005469 | A1* | 1/2002 | Marzouk ............... G01S 5/163 250/203.4 |
| 2005/0213096 | A1 | 9/2005 | Kouris et al. |
| 2010/0208245 | A1* | 8/2010 | Leviton ............... G01S 3/7835 250/237 G |
| 2012/0188368 | A1 | 7/2012 | Shechtman et al. |
| 2014/0231589 | A1 | 8/2014 | Tsao et al. |
| 2015/0002854 | A1* | 1/2015 | Laine ..................... G02B 6/122 250/203.6 |
| 2015/0331082 | A1 | 11/2015 | Zollars et al. |

FOREIGN PATENT DOCUMENTS

| | | |
|---|---|---|
| CN | 102116642 B | 8/2012 |
| CN | 103234511 A | 8/2013 |
| CN | 104011500 A | 8/2014 |
| CN | 104034353 A | 9/2014 |
| CN | 104280048 A | 1/2015 |
| EP | 0625692 A1 | 11/1994 |
| EP | 0571256 B1 | 9/1996 |
| EP | 1911676 A1 | 4/2008 |
| GB | 2280259 A | 1/1995 |
| RU | 2481554 C2 | 5/2013 |
| RU | 2575766 C1 | 2/2016 |
| WO | 0138896 A1 | 5/2001 |
| WO | 2012125751 A2 | 9/2012 |
| WO | 2014102841 A9 | 7/2014 |

OTHER PUBLICATIONS

Antonello, Andrea, et al., "Low-Cost, High-Resolution, Self-Powered, Miniaturized Sun Sensor for Space Applications," 4S Symposium, Jun. 2016, 14 pages.

Arshad, Muhammad, et al., "Active Pixel Digital Sun Sensor for Satellites," International Conference on Electrical Engineering, Feb. 2018, IEEE, 7 pages.

Author Unknown, "Fine (Digital) Sun-Sensor," Product Specification, Version 2b, 2013, NewSpace Systems, 2 pages.

Author Unknown, "Fine Sun Sensor FSS," Data Sheet, Apr. 2015, Jena-Optronik GmbH, 2 pages.

Author Unknown, "More Than 1,200 Satellites to Be Launched Over the Next 10 Years," Space Daily, spacedaily.com/reports/More_Than_1200_Satellites_To_Be_Launched_Over_The_Next_10_Years_999.html, Sep. 7, 2010, Paris, France, 2 pages.

Author Unknown, "The Trillion Dollar Market: Fuel in Space from Asteroids," planetaryresources.com/2014/06/fuelspace/, Jun. 6, 2014, 4 pages.

Chang, Young-Keun, et al., "Development of high-accuracy image centroiding algorithm for CMOS-based digital sun sensors," Sensors and Actuators A, vol. 144, Issue 1, May 2008, Elsevier, B.V., pp. 29-33.

Karczewski, Bohdan, "Fraunhofer Diffraction of an Electromagnetic Wave," Journal of the Optical Society of America, vol. 51, Issue 10, Oct. 1961, pp. 1055-1057.

Li, Wen-Yang, et al., "Error Compensation for Area Digital Sun Sensor," Sensors, vol. 12, Aug. 2012, pp. 11798-11810.

Ovchinnikov, Michael, et al., "Approach to study satellite attitude determination algorithms," Acta Astronautica, vol. 98, Feb. 2014, Elsevier Ltd., pp. 133-137.

Rufino, Giancarlo, et al., "Multi-Aperture CMOS Sun Sensor for Microsatellite Attitude Determination," Sensors, vol. 9, Jun. 2009, pp. 4503-4524.

Wall, Mike, et al., "Lofty Goal for Private Spaceflight: 1,000 Launches a Year by 2019," space.com/14748-private-space-launches-goal-2019.html, Mar. 1, 2012, Future US, Inc., 11 pages.

Wang, Penghai, et al., "Design of a Miniature CMOS APS Star Tracker," International Journal of Electronics and Electrical Engineering, vol. 4, Issue 1, Feb. 2016, pp. 84-90.

Yang, Y., "Spacecraft attitude determination and control: Quaternion based method," Annual Reviews in Control, vol. 36, Oct. 2012, Elsevier Ltd., pp. 198-219.

Search Report for United Kingdom Patent Application No. GB1614330.7, dated Sep. 21, 2016, 4 pages.

International Search Report and Written Opinion for International Patent Application No. PCT/GB2017/052469, dated Nov. 24, 2017, 15 pages.

International Preliminary Report on Patentability for International Patent Application No. PCT/GB2017/052469, dated Mar. 7, 2019, 9 pages.

Office Action for Russian Patent Application No. 2019104364/07 dated Oct. 8, 2020, 7 pages.

Office Action (Communication pursuant to Article 93(3)) for European Patent Application No. 17757859.8 dated Dec. 10, 2021, 7 pages.

First Office Action for Chinese Patent Application No. 201780051342.8, dated Nov. 2, 2022, 22 pages.

* cited by examiner

Plan view

Section A-A

Section A-A

Section A-A

Section A-A

Section A-A

Section A-A

Section A-A

Section A-A

ATTITUDE DETERMINATION SYSTEM

This application is a 35 U.S.C. § 371 national phase filing of International Application No. PCT/GB2017/052469 filed on Aug. 21, 2017, and claims the benefit of United Kingdom Patent Application No. 1614330.7 filed on Aug. 22, 2016, wherein the contents of the foregoing applications are hereby incorporated by reference herein in their respective entireties.

The present invention relates to an attitude determination system and method, and more particularly to a system and method for determining the attitude of a spacecraft such as a satellite.

In order to operate correctly, spacecraft and satellites are required to measure (or determine) their orientation ("attitude") relative to some other object or other objects. Typically this is achieved using instruments such as star trackers or Sun sensors, which are mounted on the spacecraft or satellite. Often, multiple instruments are required to give the spacecraft or satellite sufficient field of view in all directions.

Star trackers typically use predetermined reference or guide star field patterns to allow a spacecraft or satellite to determine its position and orientation. Images of the surrounding star field are collected and compared with one or more reference star patterns to allow the positions and attitude of the satellite or spacecraft to be determined.

Sun sensors are opto-electronic devices which are used to detect the direction from which sunlight arrives. In a typical sun sensor, a light conditioning element or elements (such as baffle comprising a slit) is used to constrain the light falling onto a photo detector cell array. The amount of light falling on the array, and the cells on which the light falls, is dependent on the direction of the Sun. Therefore by measuring how much light falls on which cells of the array, the system is able to determine the Sun's direction along one axis.

Typically, a given sun sensor is only able to determine the Sun's direction along one axis along which the sun sensor is oriented. Therefore it is typically required to orient two such sun sensors perpendicular to each other in order to determine the x and y components of the attitude vector. Also, when sun sensors are used as means of attitude determination, it is common to have separate instruments that respectively, have a low accuracy but a wide field of view (coarse sun sensors), and a high accuracy but a small field of view (fine sun sensors).

The minimum possible size that a sun sensor can take is considered to be limited by the need to measure light at the photo detector array without significant diffraction of light from the slit or slits (or other light conditioning element or elements) which may add unwanted noise to photo detector measurement. For example, if a slit in the baffle (or other light conditioning element) is too small, then this may result in significant diffraction of the incident light, which may result in light falling on a "spread" of pixels in the array, thereby adding noise to the photo detector array measurements and hence leading to an inaccurate determination of the Sun's position. Therefore sun sensors are typically designed to minimize diffractive effects as much as possible, e.g. by using slits/apertures of widths/sizes that are significantly (e.g. over 100 times) greater than the wavelength of the incident light) to avoid unwanted noise in the light measurements that are used to determine Sun's direction.

It will therefore be understood that the need to keep diffractive effects minimal enough not to significantly affect the light measurements in a typical sun sensor effectively limits the minimum dimensions that a typical sun sensor can have. Thus existing star trackers and sun sensors are relatively large (~1000 cm$^3$ per instrument) and heavy (hundreds of grams per instrument).

The Applicants believe there remains scope for advantageously reducing the size and/or mass of instruments that are used to determine the attitude of spacecraft and satellites.

According to a first aspect of the present invention, there is provided an instrument for determining the attitude of a spacecraft or satellite, comprising:

a detector;

one or more conditioning elements, wherein said one or more conditioning elements are arranged to diffract electromagnetic radiation from a source of electromagnetic radiation onto said detector to create a diffraction pattern on the detector; and processing circuitry configured to determine the attitude of said spacecraft relative to said source of electromagnetic radiation based on the diffraction pattern detected by the detector.

According to a second aspect of the present invention, there is provided a method of determining the attitude of a spacecraft, comprising:

detecting a diffraction pattern created on a detector by electromagnetic radiation from a source of electromagnetic radiation interacting with one or more conditioning elements; and determining the attitude of said spacecraft relative to said source of electromagnetic radiation based on the diffraction pattern detected by the detector.

The present invention relates to an instrument for a spacecraft that detects electromagnetic radiation (e.g. visible light) from an external source of electromagnetic radiation, and uses this electromagnetic radiation to determine the orientation of the spacecraft. However, unlike prior art systems, the present invention actively creates and detects a diffraction pattern by interacting this incident electromagnetic radiation with one or more conditioning elements, and uses the detected diffraction pattern to determine the direction of the incident electromagnetic radiation (and hence, to determine the spacecraft or satellite's orientation relative to the source of electromagnetic radiation). This is in contrast to prior art systems which, as discussed above, do not use diffraction patterns to determine the spacecraft or satellite's orientation relative to the source of electromagnetic radiation, but instead seek to reduce diffractive effects as much as possible.

The Applicants have recognised that, since the features of diffraction patterns (such as, for example, the positions and intensities of the minima and maxima of the diffracted electromagnetic radiation) may alter based on the angle of incidence of the electromagnetic radiation, diffraction patterns can themselves be used as a means of determining the direction to a light source (e.g. the Sun), and hence as means of determining the orientation or attitude of a spacecraft or satellite.

It will be recognised therefore that the principle of operation of the present invention is fundamentally different to that of prior art systems, which actively seek to remove or minimise diffractive effects as far as possible Further, by seeking to, in effect, exploit (and maximise) diffractive effects, rather than reduce or eliminate them, the instrument of the present invention may advantageously be made to be much smaller than prior art instruments, which, as described above, are constrained in terms of size by the need to keep diffractive effects low enough to not significantly affect their standard (i.e. non-diffracted) light readings (which are used to determine the direction to the light source).

As a result of having a reduced size (in terms of physical dimensions), the present invention will also advantageously have a reduced mass compared to prior art systems. Further, the reduced size of the present invention also means that the instrument is more difficult to jam compared to prior art systems. This may potentially be useful for (e.g.) military spacecraft or satellites.

Further, by detecting diffracted light patterns, rather than standard (i.e. non-diffracted) light readings, the instrument of the present invention may have a larger effective field-of-view compared to prior art systems. The nature of the diffracted field permits reference features to remain on the active area of the imaging array (the detector) as the angle of incidence of the light increases with any reduction in the number of useful reference features being reduced (e.g. minimised) since the higher orders of the diffracted field may be exploited.

The instrument of the present invention may be configured to detect a diffraction pattern created by any type of electromagnetic radiation of any suitable wavelength originating from any suitable source, including, for example, ultra-violet light, visible light, infra-red, microwaves, radio waves, etc. Preferably, the instrument is configured to detect a diffraction pattern created by UV light from a UV light source (such as the Sun), since the shorter wavelength of UV light (compared to visible light) means that significant diffractive effects can be produced using a relatively small instrument (with relatively small optical elements). Further, by being configured to detect a diffraction pattern created using UV light from a UV light source, the instrument may also advantageously be configured to be "blind" to extraneous, e.g. visible, light.

However, the instrument may also, or instead, be configured to detect a diffraction pattern created by visible light from a visible light source (such as the Sun). For the sake of conciseness, during the remainder of the description, we will refer to "light" only, as opposed to electromagnetic radiation, when discussing the features of the present invention. However it should be understood that, unless otherwise stated, the term light as used herein is not intended to mean solely e.g. UV or visible light, but rather is intended to more generally cover all types of electromagnetic radiation.

The light conditioning elements of the present invention may be configured in any suitable or desired manner.

The light conditioning elements preferably comprise at least one holographic optical element, such as, for example, a phase shifting optical element. The holographic optical element or elements preferably comprise suitably scaled feature(s), pattern or patterns on a substrate. The holographic optical element is preferably configured to add a phase difference for incident light travelling through the holographic optical element, such that a diffraction pattern is produced at the detector.

The one or more conditioning elements may also, or instead, comprise one or more optical baffles or masks. The baffles or masks (or at least part of the baffles or masks) are preferably at least partially opaque to the incident light, in order to at least partially restrict the amount of incident light reaching the detector.

The conditioning elements may also comprise one or more apertures through which incident light is able to travel and through which the incident light is diffracted onto the detector. The apertures may be provided, e.g. between baffles or masks (i.e. with the baffles or masks shaped such that they comprise apertures), or the apertures may be provided between different (i.e. separate) baffles or masks. The one or more conditioning elements may comprise a component with a periodic structure, such as an optical grating, with multiple apertures.

As will be understood, it would be possible to produce a diffraction pattern at the detector using only a single holographic optical element or aperture to diffract incident light. However, according to a preferred embodiment of the present invention, the one or more conditioning elements comprise a plurality of holographic optical elements and/or apertures. In this preferred embodiment, as will be understood, the diffraction pattern that is received at the detector is produced by the light diffracted from each of the plurality of holographic optical elements and/or apertures. In some embodiments, it is not necessary for the system to know or to determine which features (e.g. maxima/minima) in the diffraction patterns are produced by which of the plurality of holographic optical elements and/or apertures.

Thus, in a most preferred embodiment of the present invention, the light conditioning elements comprise one or more holographic optical elements and one or more optical baffles or masks comprising at least one aperture.

The width or size of the features of the holographic optical elements and/or apertures may be uniform (i.e. all the same). Alternatively, at least some of the features of the holographic optical elements and/or apertures may be of different widths or sizes to at least some of the other features of the holographic optical elements and/or apertures.

In arrangements wherein the one or more conditioning elements comprise a plurality of holographic optical elements and/or apertures, the plurality of holographic optical elements and/or apertures could be sized and spaced such that the diffraction pattern that is received at the detector comprises individual diffraction patterns resulting from each of the holographic optical elements and/or apertures, with none of the individual diffraction patterns resulting from each of the holographic optical elements and/or apertures substantially overlapping or interfering with any of the other individual diffraction patterns from any of the other holographic optical elements and/or apertures. However, in preferred embodiments, the holographic optical elements and/or apertures are spaced and sized such that diffraction patterns that arise from different individual holographic optical elements and/or apertures at least partially overlap and interfere at the detector.

The Applicants have noticed, in this regard, that by providing a plurality of holographic optical elements and/or apertures through which light is diffracted, with overlapping individual diffraction patterns, a more complex diffraction pattern (with more diffractive "features") may be produced at the detector. This extra detail added to the detected diffraction pattern may be such that the diffraction patterns are more strongly dependent (i.e. more changeable depending on) the angle of the incident light. Hence providing more complex diffraction patterns in this manner may advantageously allow for a more accurate determination of the light source direction.

The holographic optical elements and/or apertures of the light conditioning elements, through which light is diffracted onto the detector, may be "empty" (e.g. filled with air, or a vacuum). However, in some embodiments, at least some of the apertures comprise a material other than air through which light is able to travel. For example, the apertures may comprise glass, sapphire, plastic, etc. (As will be understood, the material, as well as e.g. the thickness of the material, may be chosen in order to further condition the light in advantageous ways, through refraction or other optical effects, which may also affect the diffraction pattern that is produced).

As will be understood, the diffraction pattern received at the detector will be a function of many parameters including, for example, the width or size of the light conditioning elements' (holographic optical elements and/or apertures) features through which light is diffracted, the wavelength of the incident light, the distance from the light conditioning elements to the detector, etc. The widths or sizes of the holographic optical elements and/or apertures (or their features) is preferably small enough to result in significant diffraction of the incident light. The widths or sizes of the holographic optical elements and/or apertures (or their features) are preferably chosen in accordance with these other parameters in order to provide a diffraction pattern at the detector which is appropriate for the resolution and size of the detector (discussed further below).

The dimensions of the light conditioning elements' features (holographic optical elements and/or apertures) and the distance to the detector should be and are preferably chosen (according to the wavelength of light being detected) such that the Fraunhofer diffraction region is employed. This helps to ensure that the diffraction pattern is well defined at the plane of the detector array, In preferred embodiments, the widths or sizes of the features of the holographic optical elements and/or apertures are between around 10 µm and around 75 µm, and the distance from the detector to the conditioning elements (optical mask) is around 9 mm.

It would be possible for the one or more conditioning elements to be arranged along a single axis or direction. For example, it would be possible to provide a baffle or baffles with apertures extending along a single direction only. However, according to a preferred embodiment, the one or more conditioning elements are provided in a two-dimensional plane, preferably with holographic optical elements and/or apertures and/or their features extending across both dimensions of the two-dimensional plane.

The Applicants have noticed in this regard that, by providing conditioning elements extending in a two-dimensional plane (e.g. with holographic optical elements and/or apertures and/or their features extending in both of the two (x and y) dimensions), the conditioning elements may be used to produce a two-dimensional diffraction pattern which is cast onto the detector, wherein the features of the two-dimensional diffraction pattern (e.g. the intensities and positions of the minima and maxima, etc.) are dependent on both the x axis and y axis directions of the light source. Because of this, the two-dimensional diffraction pattern may be used to determine both the x and y components of the attitude vector towards the light source.

Therefore, in this preferred embodiment of the present invention, it is possible to determine the two-dimensional attitude vector for the spacecraft or satellite using only a single instrument/detector. This is in contrast to, and advantageous over, prior art systems which use two separate sensors arranged orthogonally to one another in order to determine the x and y components of the attitude vector.

Thus, according to a preferred embodiment of the present invention, the one or more conditioning elements comprise holographic optical elements and/or apertures extending in, and/or with features extending in, two axis directions, e.g. in each of the two (i.e. x and y) dimensions (in orthogonal axis directions (e.g. x and y) of the plane of the detector (wherein, e.g., the plane of the detector array is considered to be parallel to the x-y plane), and the diffraction pattern received at the detector comprises a two-dimensional diffraction pattern. Thus, according to the preferred embodiment, the conditioning elements do not comprise essentially one-dimensional "slits".

According to a preferred embodiment of the present invention, the determining the orientation of the spacecraft comprises determining a two-dimensional attitude vector based on said two-dimensional diffraction pattern.

The conditioning elements (comprising holographic optical elements and/or apertures and/or such features) may be provided in a two-dimensional Cartesian arrangement. For example, the conditioning elements may comprise a first set of holographic optical elements and/or apertures extending along (i.e. parallel to) an x axis of the one or more conditioning elements, and a second set of holographic optical elements and/or apertures and/or such features extending along a y axis of the one or more conditioning elements. However, preferably, the conditioning elements are not provided in a Cartesian arrangement. According to a preferred embodiment, the conditioning elements are provided in a substantially curved or circular (i.e. polar) two-dimensional arrangement. In one embodiment, the conditioning elements comprise apertures in concentric rings, between annular segments of baffle or masks. Other substantially circular (polar) arrangements are of course possible, however. For example, the holographic optical elements and/or apertures may be pin-holes, spirals, rings, ovals etc. The (or at least some of the) holographic or phase-conditioning optical elements and/or apertures and/or such features may thus be substantially circular, annular, oval-shaped, spiral-shaped and/or otherwise curved.

In these substantially circular (polar) arrangements, it would be possible for the conditioning elements to be entirely radially symmetric. For example, the light conditioning elements may comprise apertures in concentric rings between annular segments of baffle, with each ring (and correspondingly, each baffle) having a single fixed diameter and width across its entire circumference, and/or radially symmetric.

However, in some embodiments of the present invention, the conditioning elements are radially asymmetric. For example, the light conditioning elements may comprise apertures in concentric rings between annular segments of baffle, with each ring (and correspondingly, each baffle) having a diameter and/or width which varies across its circumference. Alternatively, or additionally, the holographic optical elements and/or apertures and/or their features may be of a substantially spiral shape, e.g. with holographic optical elements and/or apertures and/or their features provided at different radii from the conditioning element's central axis.

The Applicants have recognised in this regard that, by introducing a radial asymmetry to the light conditioning elements, a more complex diffraction pattern may be provided at the detector. In this manner, more detailed information can be extracted from the resulting (two-dimensional) diffraction pattern regarding the direction of the incident light.

Thus, according to a preferred embodiment of the present invention, the one or more conditioning elements comprise a two-dimensional, radially asymmetric baffle or mask comprising apertures and/or holographic features through which light is diffracted to form a two-dimensional diffraction pattern at the detector.

The light conditioning elements may, e.g., vary in shape across two dimensions (e.g. along two axis directions, e.g. x and y, wherein the detector array is arranged substantially parallel to the x-y plane), but be substantially uniform across a third dimension (e.g. axis direction z). However, in a preferred embodiment of the present invention, at least one of the at least one light conditioning elements varies across a third (z) dimension. In other words, the light conditioning element may be a "three-dimensional" light conditioning element with a "height" that varies over (e.g. the x and/or y axis directions of) the light conditioning element, and with holographic optical elements and/or apertures and/or their features extending/varying in all three dimensions. The diffractive features (e.g. holographic optical elements and/or apertures and/or their features) may be provided substantially parallel to the detector array, or, alternatively, provided substantially non-parallel to the detector. The three-dimensional optical elements may also be used to produce diffraction patterns with intensity profiles that vary along the vertical (z) axis (as well as, e.g. along the x and y axes).

Such a three dimensional light conditioning element may comprise, for example, a non-inverted or inverted slumped optical element. The three-dimensional light conditioning element may be curved, e.g. in any of the three dimensions, as desired. Other three dimensional geometries would be possible, however. The applicants have noticed in this regard that by interacting incident light with such a three dimensional optical element (with a variable "height"), a more complex diffraction pattern (with more diffractive "features") may be produced at the detector, which may, e.g., and as described above, vary greatly according to the direction of the incident light, and hence advantageously allow for a more accurate determination of the light source direction. Further, using a three-dimensional optical element may allow directional conditioning of the incident light.

Thus, according to a preferred embodiment of the present invention, the one or more conditioning elements comprises one or more three dimensional conditioning elements.

In some embodiments, the light conditioning elements may also comprise a conditioning lens to condition the light for detection by the detector. For example, the light conditioning elements may comprise a concave glass lens. In some embodiments (e.g. wherein the light conditioning elements comprise holographic optical elements), it may be that a lot of incident light is transmitted through the light conditioning elements. If such a large amount of incident light were allowed to reach the detector, then this could result in the detector being "washed-out" with stray light, and could thereby compromise the quality of the diffracted light (diffraction patterns) incident on (and being detected by) the detector. A conditioning lens may be provided in order to focus the light at the plane of the detector, and thereby ensure that the diffracted light patterns being detected are suitably well defined.

The detector of the present invention may be arranged and configured as desired. The detector is preferably capable of measuring the intensity of light (i.e. the intensity of the diffraction pattern) at various positions on the detector, and capable of at least distinguishing between minima and maxima intensities in the diffraction light patterns.

The detector preferably comprises an array of individual detector cells. In embodiments wherein a two-dimensional diffraction pattern is created using two-dimensional light conditioning elements, the detector preferably comprises a two-dimensional array of detector cells. In some embodiments, the detector comprises a three-dimensional array of detector cells, to detect varying intensity profiles along the z direction. The resolution of the detector (and, e.g., the sizes of the individual detector cells) is preferably chosen based on the sizes of the features of various diffraction patterns that are expected to be produced. For example, the detector preferably has a resolution that is fine enough to distinguish between at least some of the adjacent maxima and minima in the diffraction pattern or patterns that are expected to be produced. In one embodiment, wherein the instrument is arranged to diffract and detect light of around 400 nm, the detector has a resolution of 2220 by 3002 pixels, and a pixel size of 3.5 µm by 3.5 µm.

The determining of the orientation of the spacecraft relative to the source of light based on the detected diffraction pattern is preferably comprises determining a direction vector to the light source based on the detected diffraction pattern. This may be carried out in any suitable and desired fashion.

In one embodiment, the system analyses the positions and intensities of the signal recorded by the detector (i.e. the detector output) to determine various parameters relating to features of the light diffraction pattern. These parameters may include, for example, the absolute and/or or relative positions and/or the absolute and/or relative intensities of particular minima and/or maxima in the detected pattern, the distances (i.e. spacing) between adjacent minima and/or maxima in the diffraction pattern, etc. The parameters may also include parameters relating to (e.g. the shape of) the intensity profile of the detected light pattern, e.g. around the various maxima and/or minima (such as, for example, the absolute and/or relative intensities around the various minima/maxima, the absolute and/or relative positions of features in the diffraction pattern around the various minima/maxima, etc.). The determined values are then preferably used to determine (or calculate) a direction vector to the light source.

As will be understood, the process of determining a direction vector to the light source based on the determined features of the diffraction pattern will be dependent on the specific geometry of the instrument itself, including, for example, the geometry and shape of the light conditioning elements (e.g. the widths of and spacing between the various holographic optical elements and/or apertures and/or their features through which light is being diffracted), the distance between the light conditioning element or elements and the detector, etc. However, with knowledge of the geometry of the instrument (including the specific geometry of the light conditioning elements), as well as the wavelength of the incident light, the system is able to determine a direction vector to the light source based on the parameters relating to various features of the detected diffraction pattern.

Thus according to an embodiment of the present invention, the step of determining the orientation of the spacecraft relative to the source of light based on the detected diffraction pattern comprises determining a least one parameter value of the detected diffraction pattern and determining a direction vector to the light source using said at least one determined parameter value of the detected diffraction pattern.

According to an embodiment of the present invention, the at least one parameter value of the detected diffraction pattern comprises at least one of, and preferably plural of: the position (or positions) of minima and/or maxima in the detected diffraction pattern, the spacing between adjacent minima and/or maxima in the detected diffraction pattern; the intensity (or intensities) of minima and/or maxima in the detected diffraction pattern; and a parameter (or parameters) relating to the intensity profile around various minima and/or maxima of the detected diffraction pattern.

Alternatively, in some embodiments, instead of using measured parameters relating to various features of the detected diffraction pattern to determine the direction of the incident of light, a direction vector to the light source is determined by comparing the measured diffraction pattern (i.e. the detector output) to a set of reference diffraction patterns created using incident light at various known direction vectors. The reference diffraction patterns are preferably diffraction patterns that have been recorded using the same instrument (or equivalent instrument, with equivalent geometries) at a number of known light source direction vectors (i.e. using light at a number of different (known) angles of incidence, etc.). These reference diffraction patterns are preferably stored in a memory accessible to the processing circuitry, with each reference diffraction pattern being associated with its corresponding reference light source direction vector which was used to create the reference diffraction pattern.

In these arrangements, when attempting to determine the spacecraft or satellite's (current) orientation, the system preferably compares the detected diffraction pattern to each of, or at least some of, the reference diffraction patterns, e.g. in turn, and determines a direction vector from the spacecraft to the light source based on the comparison.

In one embodiment, the system determines which of the reference diffraction patterns is closest to the detected pattern, and, once the most similar reference diffraction pattern has been determined, the system determines the direction vector from the spacecraft or satellite to the light source to be the same as the reference direction vector corresponding to the most similar reference diffraction pattern.

In another embodiment of the present invention, the system determines a plurality of reference diffraction patterns which are most similar to the detected diffraction pattern. The system then uses the plurality of most similar reference patterns (and associated reference direction vectors) to interpolate a direction vector from the spacecraft to the light source. (This interpolation may be carried out in any suitable or desired fashion. For example, the system may determine a number of most similar reference vectors (from corresponding most similar reference diffraction patterns) and then take an average or weighted average of each of the components of each of those most similar reference vectors, in order to determine a direction vector from the spacecraft to the light source. Other arrangements are of course possible, however.)

Thus according to an embodiment of the present invention, the step of determining the orientation of the spacecraft relative to the source of light based on the detected diffraction pattern comprises comparing the detected diffraction pattern to a plurality of reference diffraction patterns, wherein each of the plurality of reference diffraction patterns corresponds to a particular reference light source direction vector, and determining a direction vector to the light source based on the comparison.

The determining of the most similar reference diffraction pattern or reference diffraction patterns to the pattern being presently detected may be carried out in any suitable or desired fashion. For example, the system may compare various sampled intensities of the measured diffraction pattern to corresponding reference intensity values of the reference diffraction patterns, and calculate the difference (or square of the difference) between the two. Other arrangements are of course possible, however.

As discussed above, the instrument of the present invention is configured to detect a diffraction pattern created using light from a light source, and then use this diffraction pattern to determine the satellite or spacecraft's orientation relative to this light source. The light source which is used in accordance with these functions of the present invention is preferably a distant light source. Preferably, the light received by the instrument is substantially parallel (or planar).

In preferred embodiments, the light source is the Sun. However, the light source may be any suitable light source from which enough light may be received by the instrument in order to obtain and record a suitable diffraction pattern. Therefore in alternative arrangements, the present invention may be used to diffract light from and (thus determine the satellite or spacecraft's orientation in relation to) other light sources in addition to or instead of the Sun, including, for example, the Earth, other planets or stars, or light sources on other satellites or spacecraft.

In some embodiments, the present invention is configured to diffract light from (and thus determine the satellite or spacecraft's orientation in relation to) a plurality of different light sources (e.g. at the same time). In these embodiments, the system is preferably able to discriminate between light received from different light sources via analysis of the different diffractive patterns resulting from the different wavelengths of incident light received from the various different light sources. For example, the system may obtain (and record) a first diffraction pattern resulting from incident light of a first wavelength, wherein this first wavelength corresponds to, e.g., the wavelength of light received directly from the Sun. The system may also may obtain (and record) a second diffraction pattern resulting from incident light of a second wavelength, wherein this second wavelength corresponds to e.g., the wavelength of light received from a second light source, such as a nearby planet (e.g. Earth).

The multiple diffraction patterns resulting from the different wavelengths on the detector array may be discriminated at the detector based on the pattern itself (i.e. the spacings of the minimum/maximum), and/or by the colour (i.e. photon wavelength) of the detected light. The multiple diffractions may also be or instead be discriminated by directionally discriminating (e.g. dispersing) the incident light based on its wavelength, e.g. by using a three-dimensional conditioning element such as a three-dimensional holographic optical element, or any other suitable method.

By recording multiple diffraction patterns from multiple light sources in this manner, the system is preferably able to determine the spacecraft or satellite's orientation in relation to multiple different light sources. By providing multiple reference points in this manner, the system is preferably able to provide more detailed attitude information for the spacecraft or satellite. For example, the system may take measurements from multiple different sources (on a single detector array), and combine them to provide an overdetermined attitude measurement.

According to some embodiments, the present invention may determine the orientation of the spacecraft relative to the source of light based upon a (single) output (i.e. a single diffraction pattern detected at the detector, at a single time). However in some embodiments of the present invention, the instrument may determine the orientation of the spacecraft dynamically, based on, e.g., multiple diffraction patterns detected at the detector, at e.g. different times. In these embodiments, the changes in the diffraction pattern e.g. as the spacecraft moves relative to the light source, may be used to more accurately determine the orientation of the spacecraft relative to the source of light. Further, by using multiple diffraction patterns detected at multiple different times, the instrument may determine the dynamic behaviour of the spacecraft, including, e.g., spin rates, spin direction, tumble analysis, etc.

A number of preferred embodiments of the present invention will now be described by way of example only and with reference to the accompanying drawings, in which.

Figure 1:
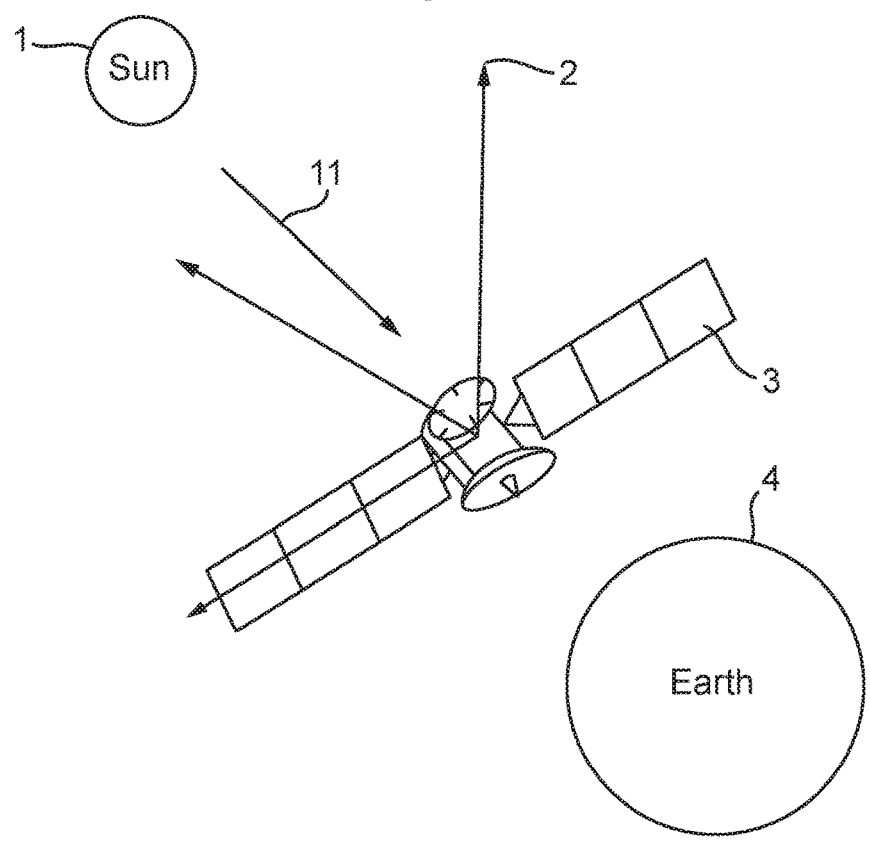
FIG. 1 shows schematically a spacecraft which may be mounted with an instrument for determining its attitude in accordance with the present invention.
Figure 2:
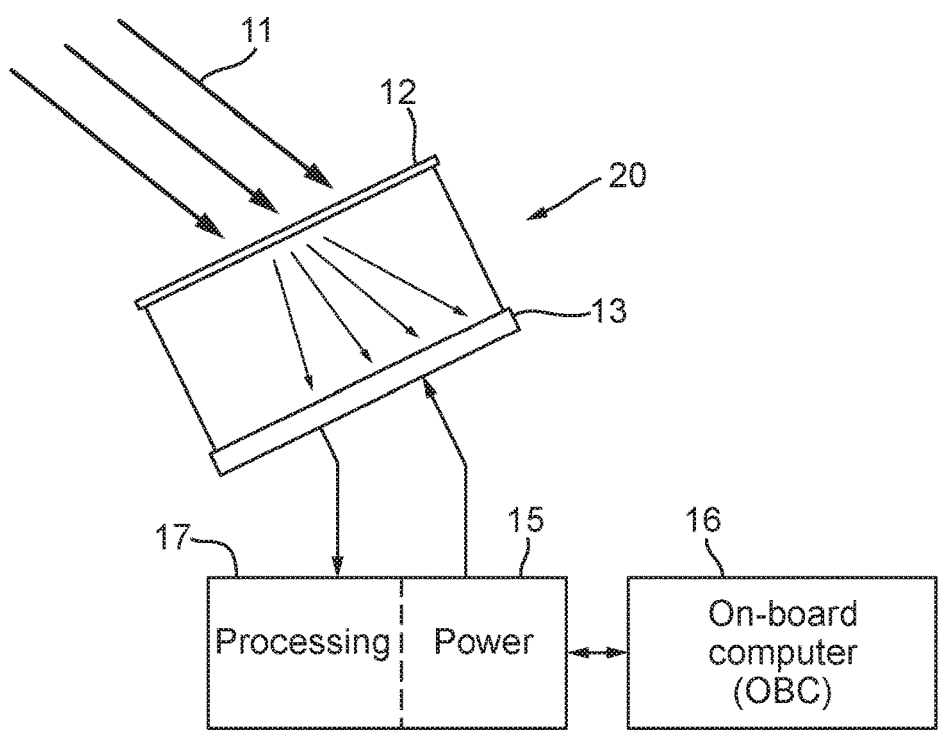
FIG. 2 shows schematically an embodiment of an instrument for determining the attitude of a spacecraft in accordance with the present invention.

FIG. 1 shows a spacecraft 3, such as a satellite, with an internal coordinate system 2, which may be mounted with an instrument for determining its attitude in accordance with the present invention. The instrument receives incident light 11 from the Sun 1, and determines a direction vector to the Sun 1 (to determine the attitude of the spacecraft 3 relative to the Sun 1). (Although FIG. 1 only shows incident light 11 being received from the Sun 1, it should be understood that incident light may be received by the instrument from several different light sources at once (including, e.g., the Earth 4), and the instrument may be used to determine the attitude of the spacecraft relative to each or any of these sources.) FIG. 2 shows an instrument 20 for determining the attitude of the spacecraft 3 on which it is mounted in accordance with the present invention. Incident light 11 interacts with one or more light conditioning elements 12 (e.g. holographic optical elements and apertures) to form a diffraction pattern at a photo-sensitive detector 13. The intensity distribution of light on the detector 13 is dependent on the angle of incidence of the incident light 11. An on-board computer 16 determines the direction vector to the Sun (and hence the attitude of the spacecraft relative to the Sun) based on the output of the photo-sensitive detector 13.

The detector 13 has a size of 7.74 mm by 10.51 mm, and the distance from the light conditioning elements 12 to the detector 13 is 8.89 mm. The instrument therefore has a volume of around 1000 mm$^3$. The instrument has a mass of less than 20 g.

FIG. 3 shows a number of example baffles (or masks) that may be used as (or provided as part of) the light conditioning elements 12 used to diffract incident light 11 in accordance with the present invention.

Figure 3A:
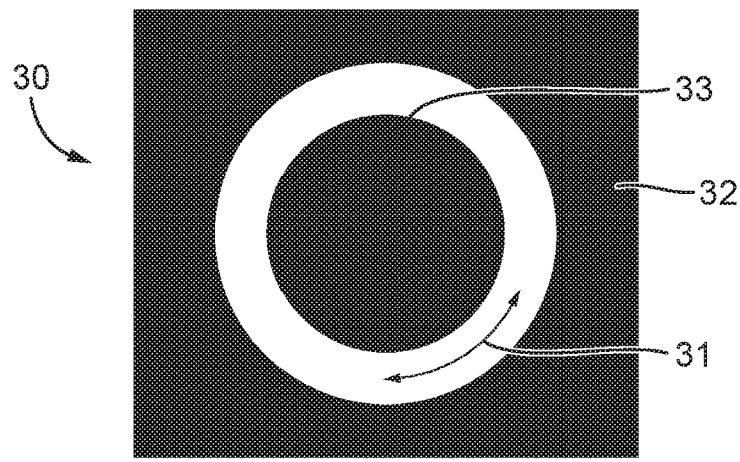
FIG. 3 shows a number of baffle patterns for creating diffraction patterns in accordance with various embodiments of the present invention.

FIG. 3a shows an annular aperture mask 30 comprising an opaque outer portion 32 and an opaque inner portion 33. These portions block incident light 11. The light is transmitted and diffracted through annular aperture 31, arranged between the outer portion 32 and inner portion 33. The opaque inner portion 33 has a diameter of 225 μm and the aperture 31 has an outer diameter of 300 μm.

Figure 3B:
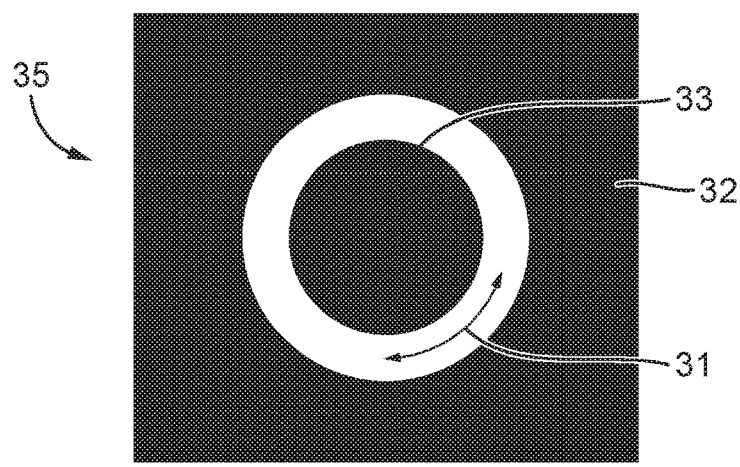
Figure 3C:
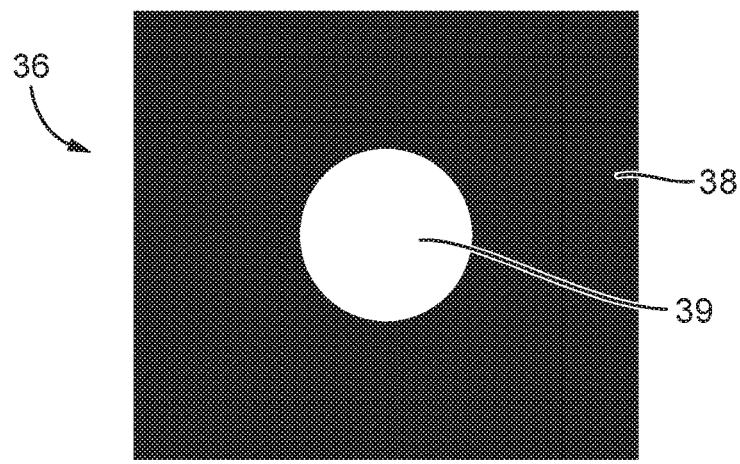

FIG. 3b shows another annular aperture mask 35 with a different sized annular aperture (which, as will be understood, creates a different diffraction pattern compared to the mask 30 of FIG. 3a). The opaque inner portion 33 has a diameter of 170 μm and the aperture 31 has an outer diameter of 200 μm. FIG. 3c shows an alternative mask comprising an outer portion 38, which is used to block incident light, and a central circular aperture 39 through which light is transmitted and diffracted.

FIG. 4 shows a number of graphical representations of first order diffraction patterns created using holographic light conditioning elements in accordance with various embodiments of the present invention. The holographic light conditioning elements may be used as (or provided as part of) the light conditioning elements 12 used to diffract incident light 11 in accordance with the present invention. For the purposes of clarity, only the first order diffraction patterns are represented.

Figure 4A:
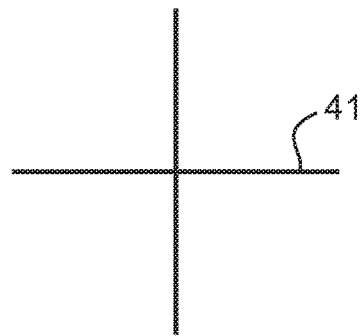
FIG. 4 shows a number of graphical representations of first order diffraction patterns created using some holographic light conditioning elements in accordance with various embodiments of the present invention.

FIG. 4a shows a first order diffraction pattern 41 from a cross-type holographic optical element (not shown).

Figure 4B:
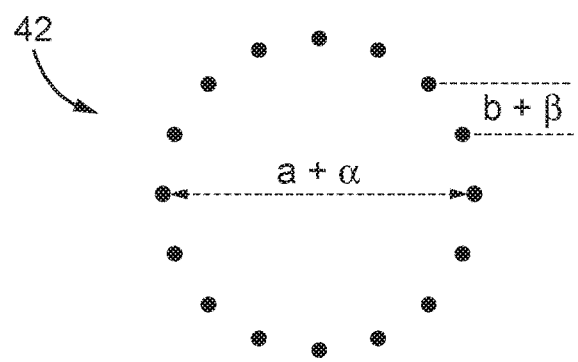
Figure 4C:
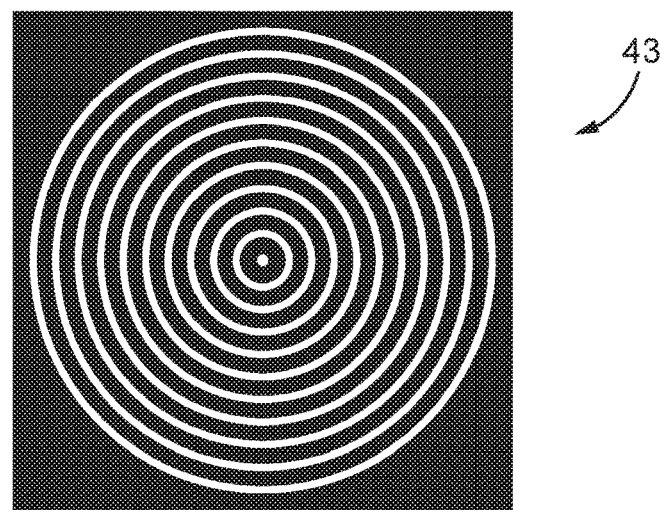

FIG. 4b shows a first order diffraction pattern 42 from circle of dots holographic optical element (not shown). The physical characteristics of the pattern are presented by the 1$^{st}$ order spread, a+α, and inter-spot separation, b+β. FIG. 4c shows a first order diffraction pattern 43 from a concentric circular holographic optical element (not shown)

FIG. 5 shows two different diffraction patterns (received at detector 13 array) that are created by interacting incident light with light conditioning elements 12 at two different angles of incidence of light, in accordance with one embodiment of the present invention. In this embodiment, the light conditioning element 12 consists of an obstructed centre annular aperture (e.g. as shown in FIG. 3a).

Figure 5A:
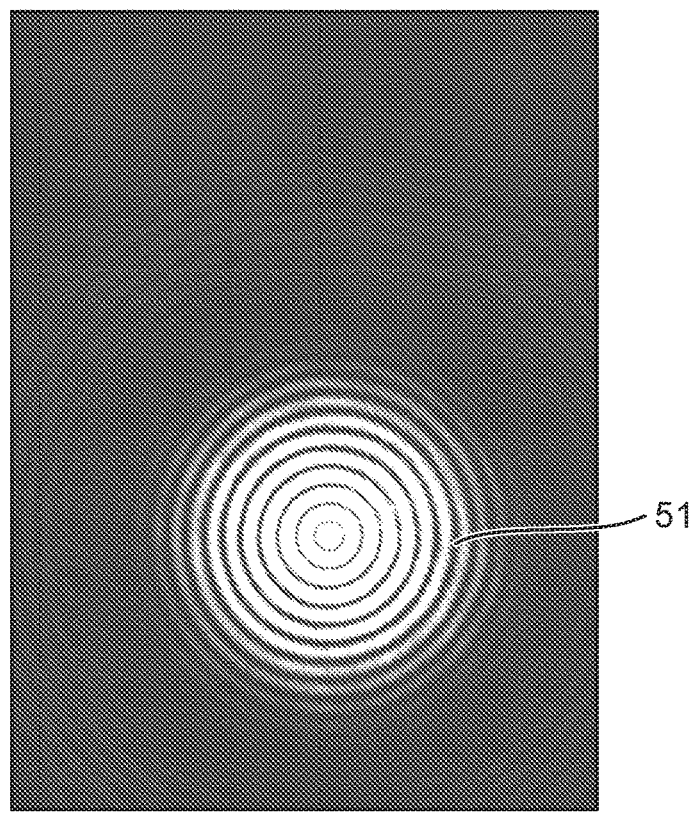
FIG. 5 shows two diffraction patterns created by an instrument according to one embodiment of the present invention using two different angles of incidence of light.

FIG. 5a shows a first diffraction pattern 51 which is created when the incident light is normal to the obstructed centre annular aperture (i.e. at angle of incidence of 0°).

Figure 5B:
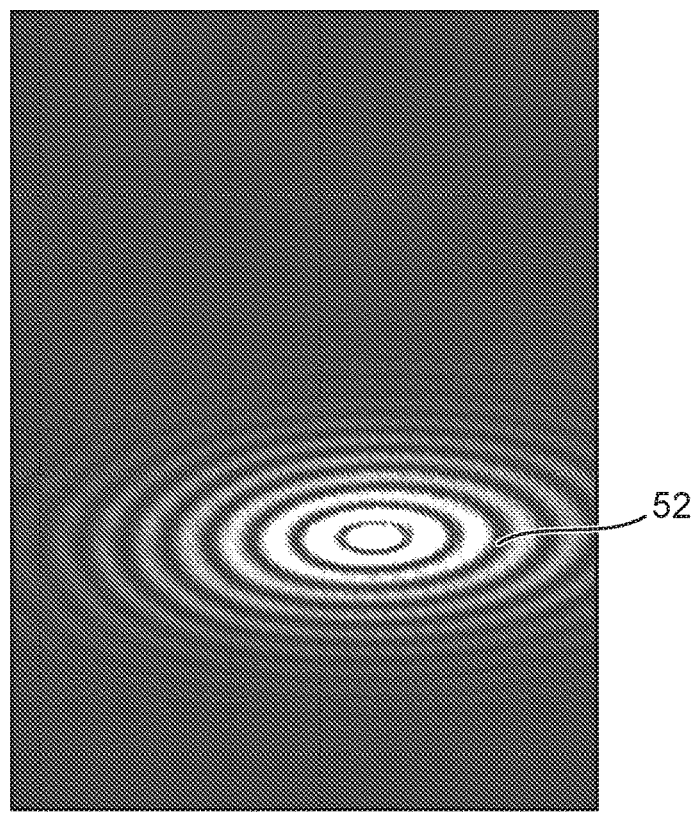

FIG. 5b shows a second diffraction pattern 52 which is created when the incident light is provided to the same obstructed centre annular aperture at an angle of incidence of 63°, As can be seen, positions of minima and maxima in the diffraction pattern, and the spacings between adjacent minima and maxima in the diffraction pattern, change according to the angle of incidence of the light.

FIG. 6 shows two different diffraction patterns (received at detector 13 array) that are created by interacting incident light with light conditioning elements 12 at two different angles of incidence of light, in accordance with another embodiment of the present invention. In this embodiment, the light conditioning elements 12 comprise an obstructed centre annular aperture (e.g. as shown in FIG. 3a, and as used to create the diffraction patterns shown in FIG. 5), in combination with a spiral holographic film.

Figure 6A:
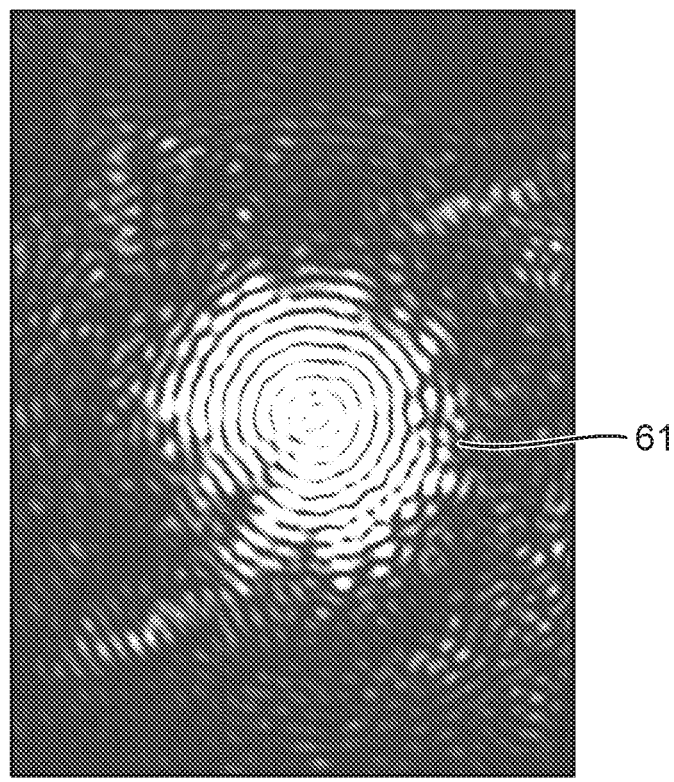
FIG. 6 shows two diffraction patterns created by an instrument according to another embodiment of the present invention using two different angles of incidence of light.

FIG. 6a shows a first diffraction pattern 61 which is created when the incident light is normal to the obstructed centre annular aperture and spiral holographic element (i.e. at angle of incidence of 0°).

Figure 6B:
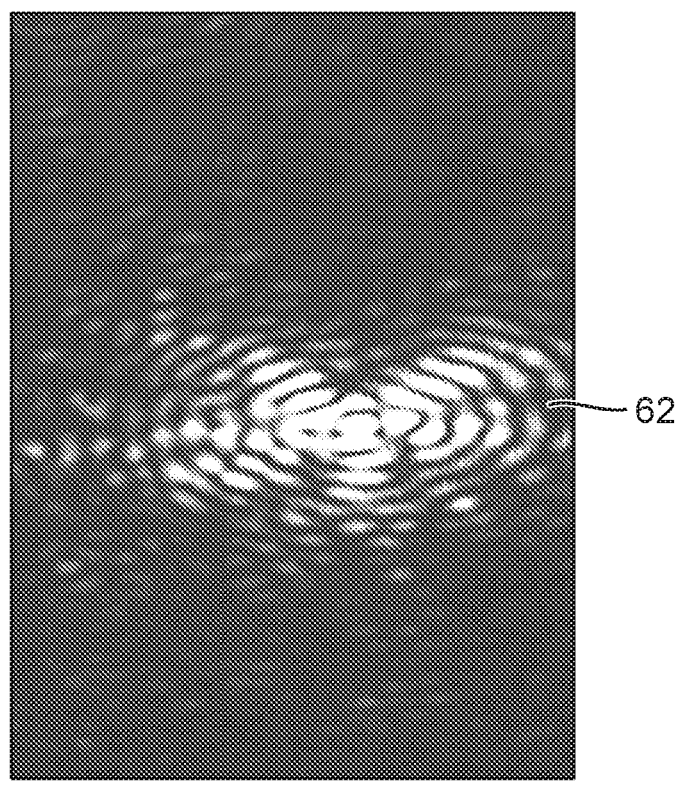

FIG. 6b shows a second diffraction pattern 62 which is created when the incident light is provided to the same obstructed centre annular aperture and spiral holographic element at an angle of incidence of 60°. As can be seen, positions of minima and maxima in the diffraction pattern, and the spacings between adjacent minima and maxima in the diffraction pattern, change according to the angle of incidence of the light.

Further, it can also be seen, by comparing the two diffraction patterns 61 and 62 shown in FIG. 6 with the diffraction patterns 51 and 52 from FIG. 5, that by interacting the incident light with an extra light conditioning element (such as a holographic spiral) a more complex diffraction pattern may be produced at the detector 13.

Figure 7A:
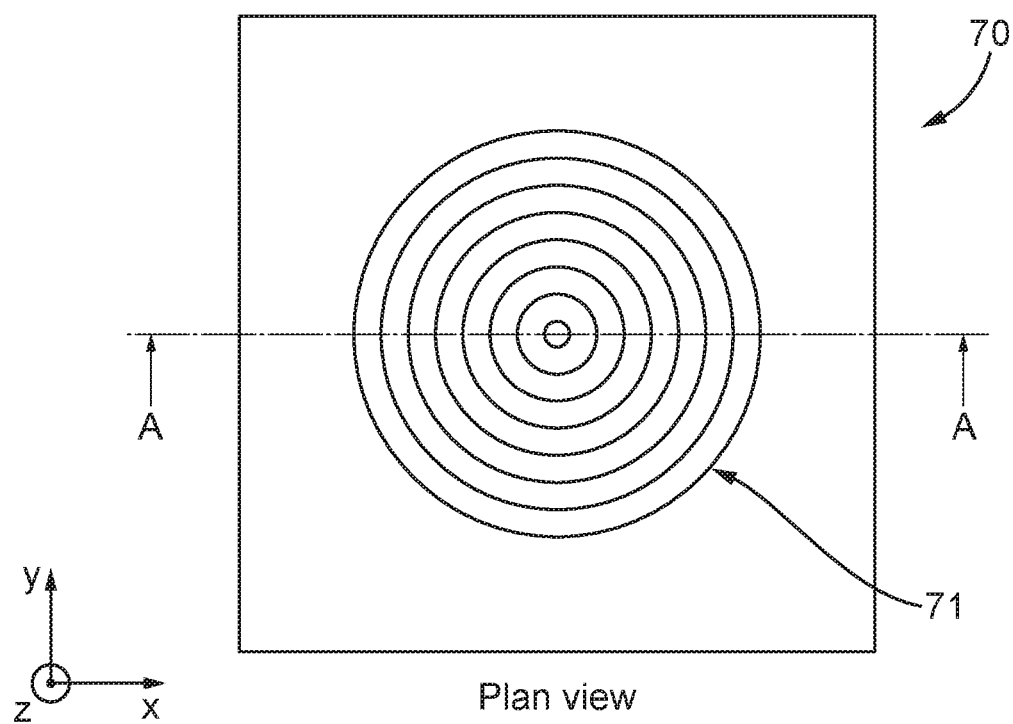
FIG. 7 shows a number of three-dimensional light conditioning elements in accordance with various embodiments of the present invention.

FIG. 7A shows a top-down view of a three-dimensional light conditioning element 70 which may be used as (or as part of) the light conditioning elements 12 according to another embodiment of the present invention. The light conditioning element 70 comprises diffractive features 71 for diffracting the incident light 11 onto the detector 13. (The diffractive features are shown here as alternating opaque/passing features. However, the diffractive features may also or alternatively be holographic optical features, or any other type of diffractive feature as described above.)

Figure 7B:
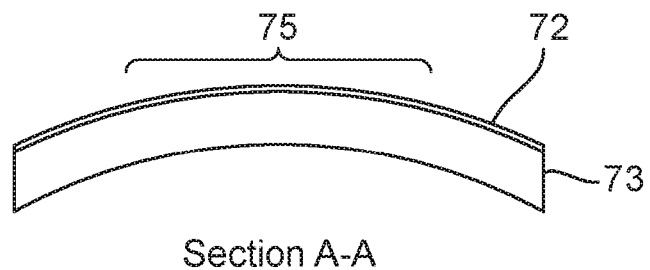

FIG. 7B shows a section profile of a domed three-dimensional light conditioning element 70 shown in FIG. 7A according to one embodiment of the present invention. In this embodiment, the light conditioning element comprises a three-dimensional optical substrate 73 beneath an opaque layer 72. An etched portion 75 (in which the diffractive features 71 are etched) is provided as part of the opaque layer 72. As can be seen, the light conditioning element shown in FIG. 7B has a curved profile.

Figure 7C:
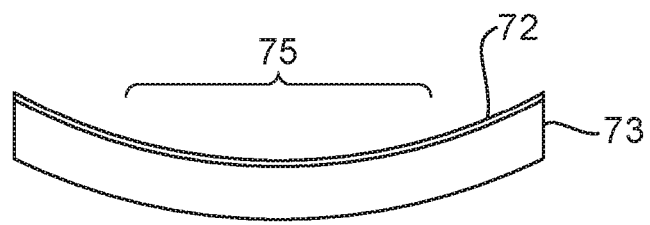

FIG. 7C shows a section profile of a recessed three-dimensional light conditioning element 70 shown in FIG. 7A according to another embodiment of the present invention. As can be seen, the light conditioning element shown in FIG. 7C has an opposite curvature compared to the light conditioning element shown in FIG. 7B.

Figure 7D:
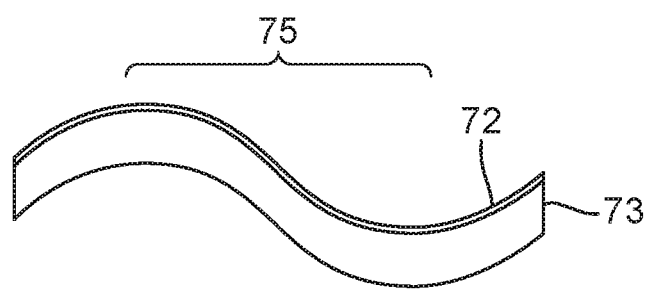

FIG. 7D shows a section profile of a three-dimensional light conditioning element 70 shown in FIG. 7A according to yet another embodiment of the present invention. The light conditioning element shown in FIG. 7D has an S-shaped curvature, and is therefore a combination domed/recessed light conditioning element.

Figure 7E:
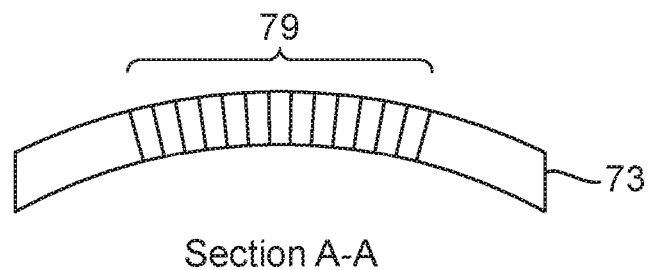

FIG. 7E shows a section profile of a domed three-dimensional light conditioning element 70 shown in FIG. 7A according to yet another embodiment of the present invention. In this embodiment, the diffractive features 71 (e.g. alternative opaque/passing features) penetrate the entire thickness (z-direction) of the light conditioning element in a diffractive portion 79. This provides the possibility to create varying intensity profiles along the vertical (z) axis, thereby enabling further conditioning possibilities of the incident light.

Figure 7F:
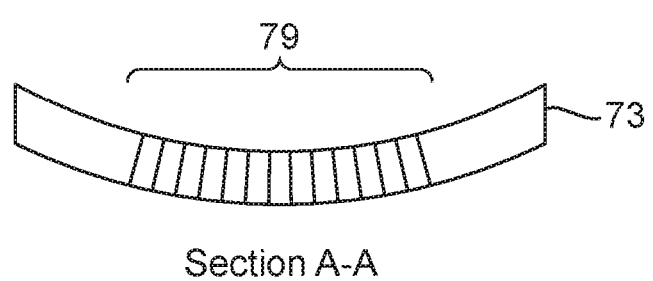

FIG. 7F shows a section profile of a recessed three-dimensional light conditioning element 70 shown in FIG. 7A, wherein, similarly to FIG. 7E, the diffractive features 71 (e.g. alternative opaque/passing features) penetrate the entire thickness (z-direction) of the light conditioning element in a diffractive portion 79. As can be seen, the light conditioning element shown in FIG. 7F has an opposite curvature compared to the light conditioning element shown in FIG. 7E.

Figure 7G:
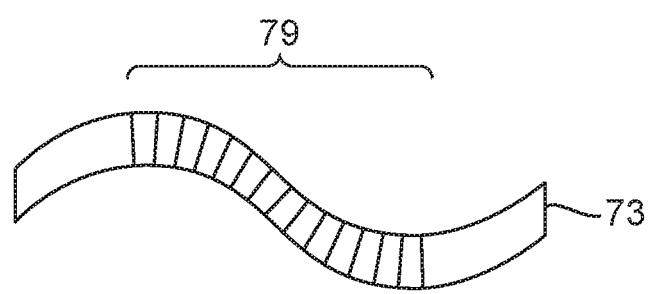
Figure 7H:
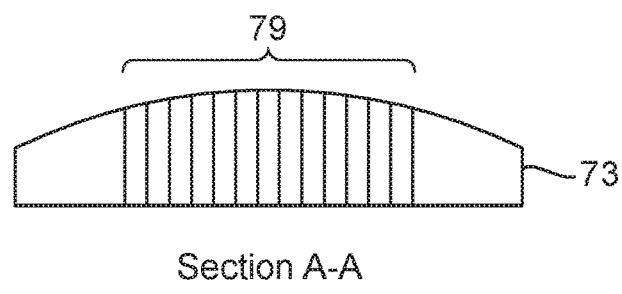
Figure 7I:
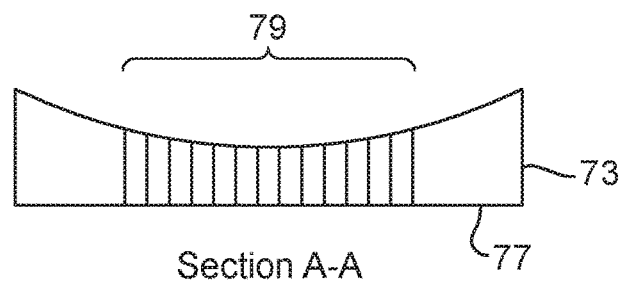

FIG. 7G shows a section profile of a three-dimensional light conditioning element 70 shown in FIG. 7A according to yet another embodiment of the present invention. The light conditioning element shown in FIG. 7D has an S-shaped curvature, and is therefore a combination domed/recessed light conditioning element. The diffractive features 71 (e.g. alternative opaque/passing features) penetrate the entire thickness (z-direction) of the light conditioning element in a diffractive portion 79. FIGS. 7H and 7I show section profiles of three-dimensional light conditioning element 70 shown in FIG. 7A according to yet further embodiments of the present invention. In these embodiments, the light conditioning element has a flat bottom surface 77.

(With regard to FIGS. 7B-I, it should be noted that although only the section profile along the centre x axis is shown, the various curvature profiles shown may be applied to both or either of the x and y axes (and at e.g. various offsets) as desired, to produce complex three-dimensional offsets) for the conditioning element 70.)

Figure 8:
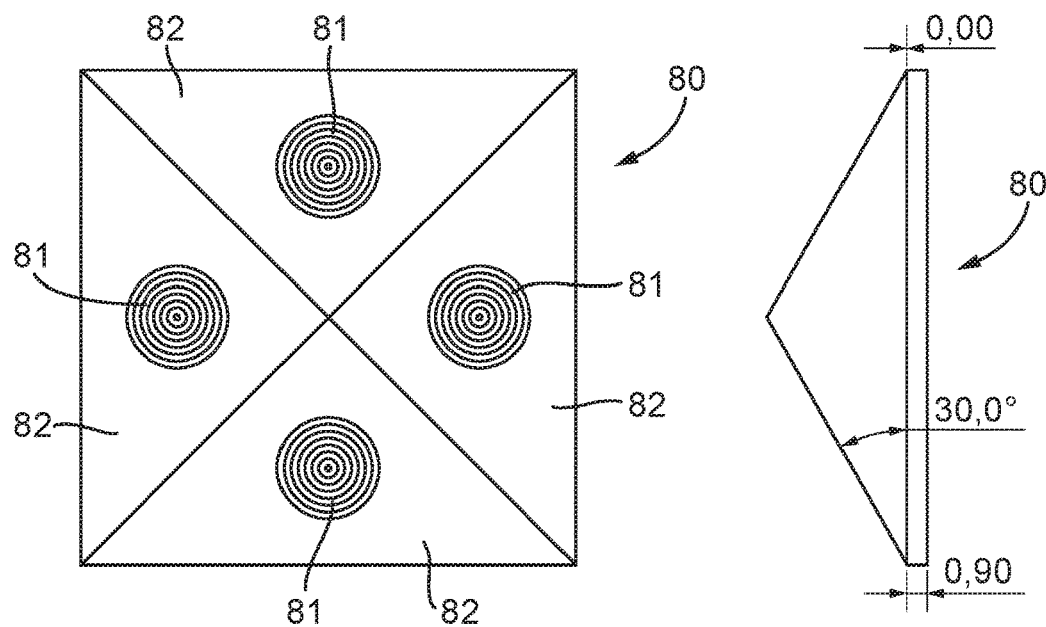
FIG. 8 shows a three-dimensional light conditioning element in accordance with another embodiment of the present invention.

FIG. 8 shows another three-dimensional light conditioning element 80 which may be used as (or as part of) the light conditioning elements 12 according to another embodiment of the present invention, wherein multiple-planar optical elements are arranged non-parallel to the detector plane. The three-dimensional light conditioning element 80 has a pyramidal shape, and comprises four sets of diffractive features 81 (e.g. blocking/transmissive features, holographic optical elements, etc.) on each of the four pyramid faces 82. According to different embodiments, the pyramid 80 may be hollow or solid, and may be opaque or transmissive, as desired.

In use, when light is incident on the three-dimensional light conditioning element 80 from a particular angle, different diffraction patterns will be created by each of the four sets of diffractive features 81 on the four pyramid faces 82. Differential analysis with respect to each of these diffraction patterns (detected by the detector 13) may provide further means for determining the direction vector to the source of light (e.g. the Sun).

Returning now to FIG. 2, the on-board computer 16 determines the direction vector to the Sun (and hence the attitude of the spacecraft relative to the Sun) based on the output of the photo-sensitive detector 13 (i.e. the detected diffraction pattern, such as those diffraction patterns shown in FIGS. 5 and 6).

In one embodiment, the on-board computer 16 analyses the positions and intensities of the signal recorded by the detector 13 (i.e. the detector output) to determine various parameters relating to features of the light diffraction pattern. These parameters may include, for example, the absolute and/or or relative positions and/or the absolute and/or relative intensities of particular minima and/or maxima in the detected pattern, the distances (i.e. spacing) between adjacent minima and/or maxima in the diffraction pattern, etc. The parameters may also include parameters relating to (e.g. the shape of) the intensity profile of the detected light pattern, e.g. around the various maxima and/or minima (such as, for example, the absolute and/or relative intensities around the various minima/maxima, the absolute and/or relative positions of features in the diffraction patter around the various minima/maxima, etc.) The on-board computer 16 then uses the determined parameter values to determine (or calculate) the direction vector to the light source (e.g. Sun). (As will be understood, to do this, the on-board computer 16 will be required to use values relating to the geometry of the instrument, for example, the geometry and shape of the light conditioning elements 12 (e.g. the widths of and spacing between the various holographic optical elements and/or apertures through which light is being diffracted), the distance between the light conditioning element or elements 12 and the detector 13, etc.) as well as the wavelength of the incident light).

In another embodiment, the on-board computer 16 determines a direction vector to the Sun by comparing the measured diffraction pattern (i.e. the detector output) to a set of reference diffraction patterns created using incident light at various known direction vectors, wherein the reference diffraction patterns are diffraction patterns that have been recorded using the same instrument (or equivalent instrument, with equivalent geometries) at a number of known light source direction vectors (i.e. using light at a number of different (known) angles of incidence, etc.). These reference diffraction patterns are stored in a memory (not shown) accessible to the on-board computer 16, with each reference diffraction pattern being associated with its corresponding reference light source direction vector which was used to create the reference diffraction pattern.

In this embodiment, when attempting to determine the spacecraft or satellite's (current) orientation, the on-board computer 16 compares the detected diffraction pattern to each of, or at least some of, the reference diffraction patterns in turn, to determine a plurality of reference patterns which are closest to the detected pattern. The on-board computer 16 then uses the plurality of most similar reference patterns (and associated reference direction vectors) to interpolate a direction vector from the spacecraft to the light source (e.g. Sun).

It can be seen from the above that the present invention provides an instrument for determining the attitude of a spacecraft which may advantageously be made to be much smaller than prior art instruments, and which may be made to have a larger effective field-of-view than prior art instruments.

This is achieved, in the preferred embodiments of the present invention at least, by detecting diffracted light patterns created by interacting incident light from an external light source with light conditioning elements of the instrument, and using the detected diffraction pattern to determine the direction of the incident light (and hence, to determine the spacecraft's orientation relative to the source of light).

The invention claimed is:

1. An instrument for determining the attitude of a spacecraft, comprising:
    a detector;
    one or more conditioning elements, wherein said one or more conditioning elements are arranged to diffract electromagnetic radiation from a source of electromagnetic radiation onto said detector to create a diffraction pattern on the detector; and
    processing circuitry configured to determine the attitude of said spacecraft relative to said source of electromagnetic radiation based on the diffraction pattern detected by the detector;
    wherein the one or more conditioning elements are substantially circular, annular, oval-shaped, spiral-shaped and/or otherwise curved in shape.

2. An instrument as claimed in claim 1, wherein said one or more conditioning elements comprises one or more apertures, wherein the electromagnetic radiation from the source of electromagnetic radiation is diffracted through said one or more apertures onto the detector.

3. An instrument as claimed in claim 1, wherein said one or more conditioning elements comprises one or more holographic or phase-conditioning optical elements.

4. An instrument as claimed in claim 3, wherein the individual diffraction patterns arising from at least some of the one or more holographic or phase-conditioning optical elements overlap at the detector.

5. An instrument as claimed in claim 3, wherein the one or more holographic or phase-conditioning optical elements extend in two dimensions, and wherein the diffraction pattern detected at the detector comprises a two-dimensional diffraction pattern.

6. An instrument as claimed in claim 5, wherein the one or more holographic or phase-conditioning optical elements are substantially circular, annular, oval-shaped, spiral-shaped and/or otherwise curved.

7. An instrument as claimed in claim 5, wherein the one or more holographic or phase-conditioning optical elements are arranged to form a radially asymmetric arrangement.

8. An instrument as claimed in claim 1, wherein said one or more conditioning elements comprises one or more three-dimensional conditioning elements.

9. An instrument as claimed in claim 1, wherein said one or more conditioning elements comprises an optical grating.

10. An instrument as claimed in claim 1, wherein the processing circuitry is configured to determine the attitude of said spacecraft relative to said source of electromagnetic radiation based on the diffraction pattern detected by the detector by determining a direction vector to the source of electromagnetic radiation based on the diffraction pattern detected by the detector, wherein the processing circuitry is configured to determine at least one parameter value of the detected diffraction pattern and calculate the direction vector to the source of electromagnetic radiation using said at least one determined parameter value of the detected diffraction pattern, and wherein the at least one parameter value of the detected diffraction pattern comprises at least one of:
    (i) position or positions of minima and/or maxima in the detected diffraction pattern,
    (ii) spacing between adjacent minima and/or maxima in the detected diffraction pattern;
    (iii) intensity or intensities of minima and/or maxima in the detected diffraction pattern; and
    (iv) at least one parameter relating to an intensity profile around various minima and/or maxima in the detected diffraction pattern.

11. A method of determining the attitude of a spacecraft, comprising:
    detecting a diffraction pattern created on a detector by electromagnetic radiation from a source of electromagnetic radiation interacting with one or more conditioning elements; and
    determining the attitude of said spacecraft relative to said source of electromagnetic radiation based on the diffraction pattern detected by the detector;
    wherein the one or more conditioning elements are substantially circular, annular, oval-shaped, spiral-shaped and/or otherwise curved in shape.

12. A method as claimed in claim 11, wherein said one or more conditioning elements comprises one or more apertures, wherein the electromagnetic radiation from the source of electromagnetic radiation is diffracted through said one or more apertures onto the detector.

13. A method as claimed in claim 11, wherein said one or more conditioning elements comprises one or more holographic or phase-conditioning optical elements.

14. A method as claimed in claim 13, wherein the individual diffraction patterns arising from at least some of the one or more holographic or phase-conditioning optical elements overlap at the detector.

15. A method as claimed in claim 13, wherein the one or more holographic or phase-conditioning optical elements extend in two dimensions, and wherein the diffraction pattern detected at the detector comprises a two-dimensional diffraction pattern.

16. A method as claimed in claim 11, wherein said one or more conditioning elements comprises one or more three-dimensional conditioning elements.

17. A method as claimed in claim 11, wherein said one or more conditioning elements comprises an optical grating.

18. A method as claimed in claim 11, wherein said source of electromagnetic radiation is the sun.

19. A method as claimed in claim 11, wherein the step of determining the attitude of said spacecraft relative to said source of electromagnetic radiation based on the diffraction pattern detected by the detector comprises determining a direction vector to the source of electromagnetic radiation based on the diffraction pattern detected by the detector, further comprising determining at least one parameter value of the detected diffraction pattern and calculating the direction vector to the source of electromagnetic radiation using said at least one determined parameter value of the detected diffraction pattern, wherein the at least one parameter value of the detected diffraction pattern comprises at least one of:
   (i) position or positions of minima and/or maxima in the detected diffraction pattern,
   (ii) spacing between adjacent minima and/or maxima in the detected diffraction pattern;
   (iii) intensity or intensities of minima and/or maxima in the detected diffraction pattern; and
   (iv) at least one parameter relating to the intensity profile around various minima and/or maxima in the detected diffraction pattern.

20. A method as claimed in claim 11, further comprising:
detecting a second diffraction pattern created on the detector by electromagnetic radiation from a second source of electromagnetic radiation interacting with one or more conditioning elements; and
determining the attitude of said spacecraft relative to said second source of electromagnetic radiation based on the second diffraction pattern detected by the detector.

\* \* \* \* \*